Oct. 28, 1952     E. L. JOHNSON     2,615,365
PHOTOGRAPHIC MICRORECORDING APPARATUS
Filed Aug. 24, 1948     4 Sheets-Sheet 1
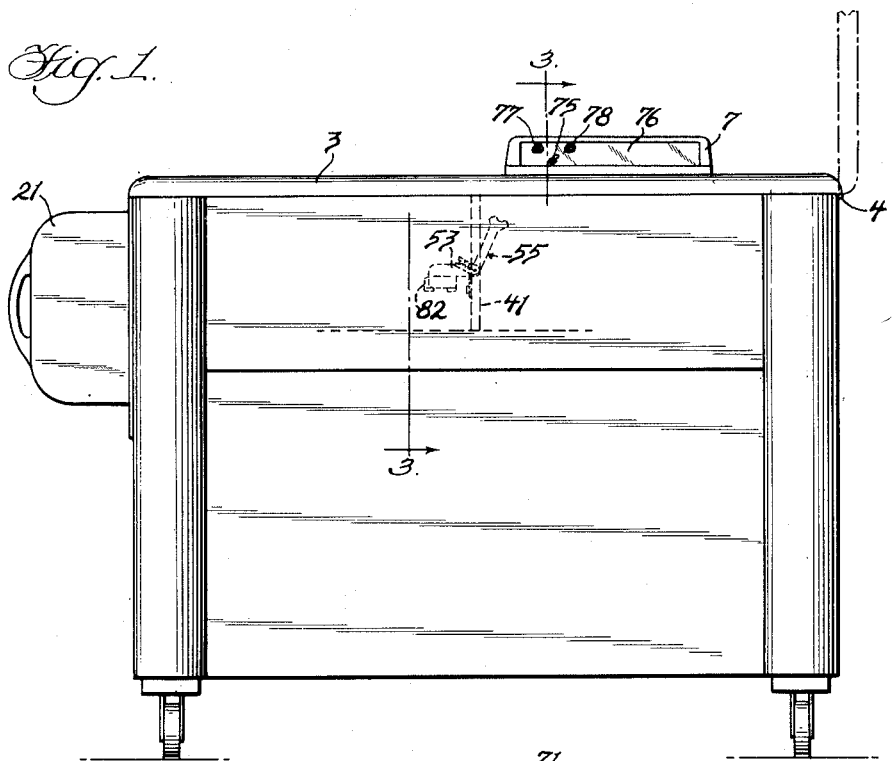
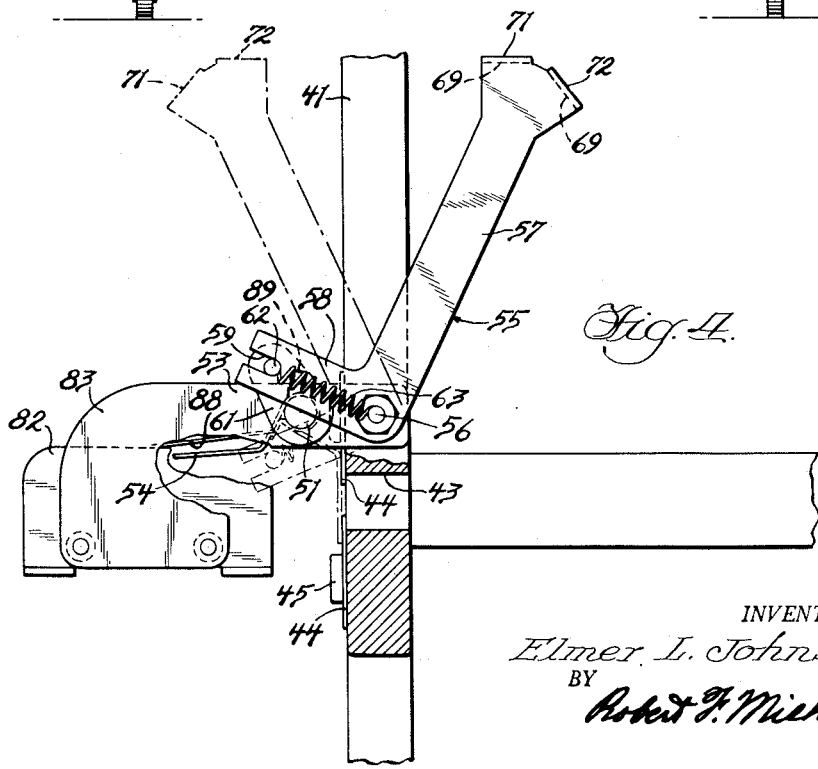
INVENTOR.
Elmer L. Johnson
BY
Robert F. Miehle, Jr.
Atty Oct. 28, 1952 E. L. JOHNSON 2,615,365
PHOTOGRAPHIC MICRORECORDING APPARATUS
Filed Aug. 24, 1948 4 Sheets-Sheet 2
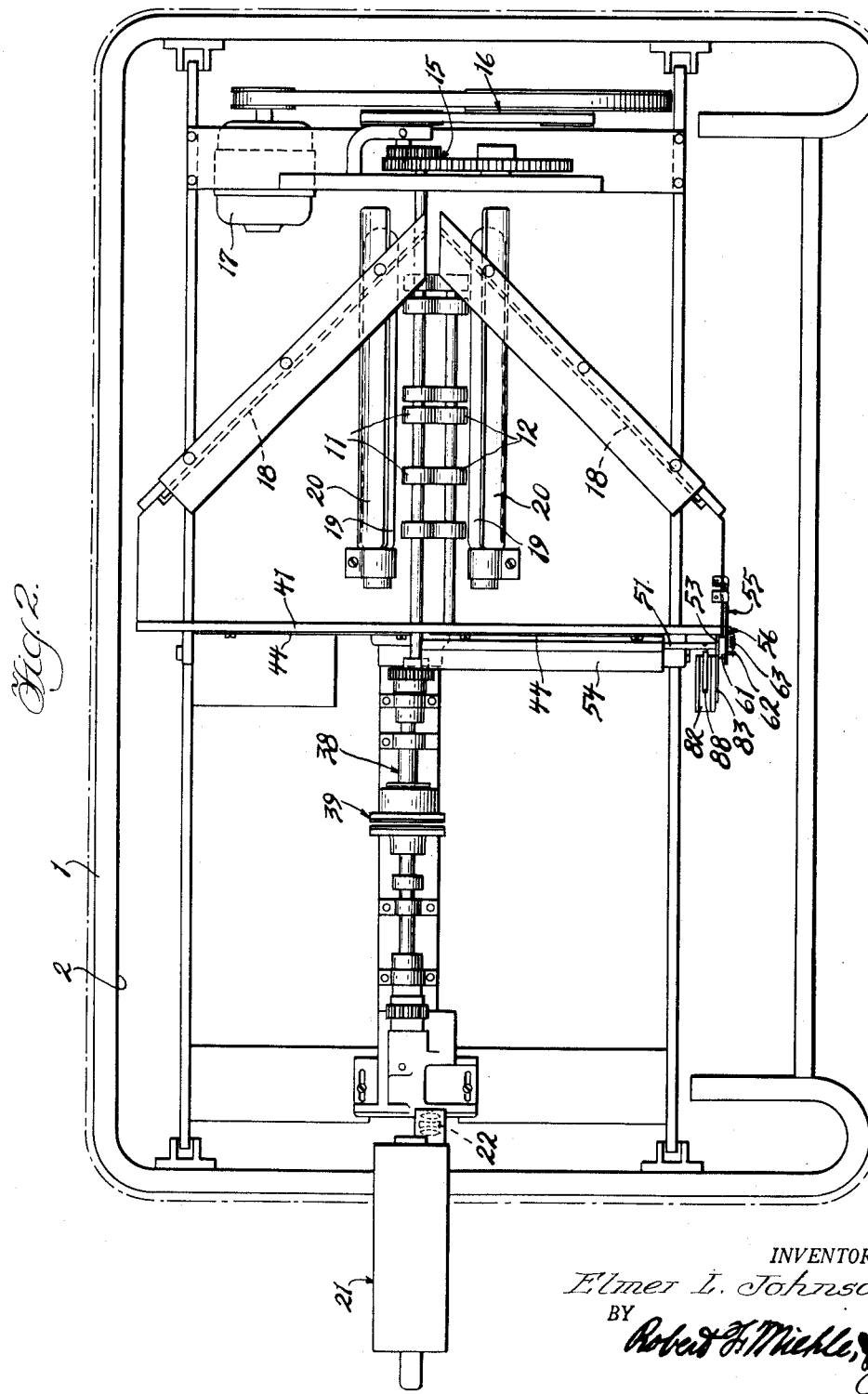
INVENTOR.
Elmer L. Johnson
BY Robert F. Miehle, Jr.
Atty.

Oct. 28, 1952 — E. L. JOHNSON — 2,615,365
PHOTOGRAPHIC MICRORECORDING APPARATUS
Filed Aug. 24, 1948 — 4 Sheets-Sheet 3

INVENTOR.
Elmer L. Johnson
BY Robert F. Miehle, Jr.
Atty.

Oct. 28, 1952 E. L. JOHNSON 2,615,365
PHOTOGRAPHIC MICRORECORDING APPARATUS
Filed Aug. 24, 1948 4 Sheets-Sheet 4
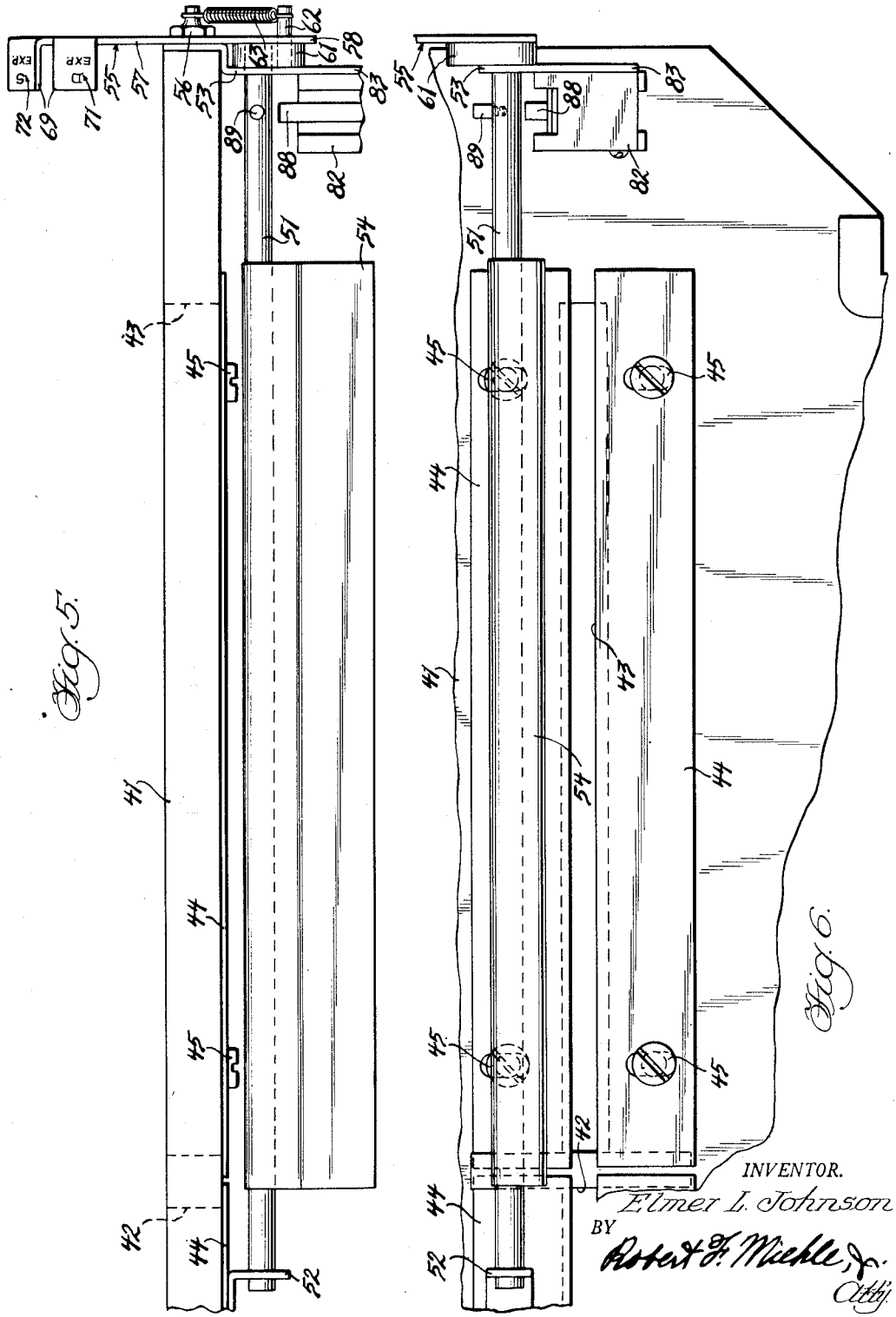
INVENTOR.
Elmer L. Johnson
BY
Robert F. Miehle, Jr.
Atty Patented Oct. 28, 1952

2,615,365

UNITED STATES PATENT OFFICE 2,615,365

PHOTOGRAPHIC MICRORECORDING APPARATUS

Elmer L. Johnson, Chicago, Ill., assignor to Bell & Howell Company, Chicago, Ill., a corporation of Illinois Application August 24, 1948, Serial No. 45,828

3 Claims. (Cl. 88—24)

The invention relates particularly to micro-recording utilizing micro-recording apparatus which normally simultaneously progressively photographs both faces of sequentially fed sheet material, such as checks or documents, respectively along adjoining longitudinal sections of a sensitized photographic strip which after such exposure is developed to form a micro-record.

It frequently happens that one face of the sheet material being recorded bears no data or bears data the recording of which is not required, so that the longitudinal section of the photographic strip upon which this face is photographed is of no record significance and is therefore wasted.

Objects of the invention reside in the provision of a novel apparatus and method whereby this otherwise wasted longitudinal section of the photographic record strip is utilized for desired recording so as to reduce the amount of photographic strip required in recording only one face of the sheet material being recorded, in the provision of a micro-recorder which will either simultaneously photograph both faces of the sheet material or photograph only one face of the sheet material while utilizing both longitudinal sections of the photographic strip for recording one face of the sheet material, in the provision of novel indicating means for indicating to the operator the type of recording in effect and whether or not the driving means of the apparatus is in operation, and in the provision of novel means whereby accidental undesired change of the type of recording and consequent undesired exposure of the photographic strip is prevented to a large extent.

The invention will be better understood by reference to the accompanying drawing forming a part hereof and in which—

Figure 1 is a front elevation of a micro-recorder embodying and arranged for the practice of the invention;

Figure 2 is a top plan view of the same with the top of the cabinet and the feed chute and control panel assembly thereof removed and with certain parts of the mechanism omitted;

Figure 4 is a partial interior view in elevation similar to that of Figure 1 with parts broken away;

Figure 5 is a partial interior view in top plan showing the shutter mechanism of the invention;

Figure 6 is a partial interior view showing the shutter mechanism of the invention in side elevation;

Figure 3:
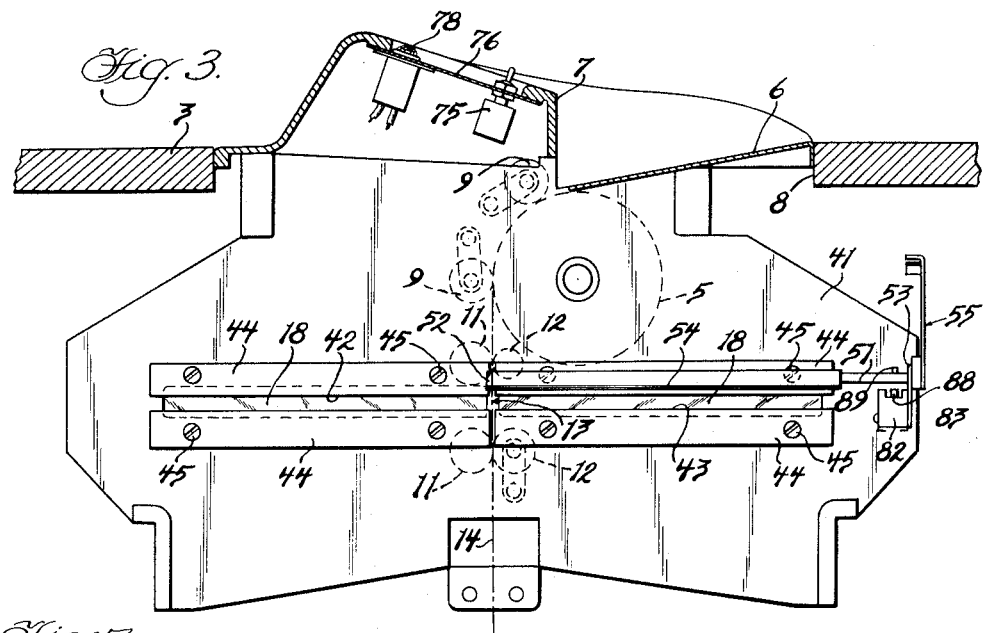
Figure 3 is a partial sectional view substantially on the line 3—3 of Figure 1.

Referring to the drawing, the major portion of the recorder is desirably enclosed within a cabinet 1 resembling an office desk, see Figures 1 and 2, which has a top opening 2 providing access into the cabinet and has a top closure member 3 hinged at one end of the cabinet, as designated at 4, for movement into and out of position closing the opening 2, the closed position of the top member being shown in full lines in Figure 1, and the open position of the same being shown in dot and dash lines in Figure 1.

A sheet material or document feeding mechanism is arranged within the cabinet adjacent one end thereof and comprises as follows:

A rotatable feed drum 5 is disposed at the top of the cabinet and receives sequentially fed sheets from an inclined feed chute 6 immediately above the feed drum and carried on a support member 7 arranged in an aperture 8 through the top member 3. See Figure 3. Spring urged rotatable pressure rollers 9 engage the feed drum, and the sheets, as they are fed to the feed drum, are engaged between the feed drum and rollers 9 and are fed downwardly by the feed drum as it is rotated.

A pair of vertically spaced rotatable feed rollers 11 are arranged below the feed drum 5, and spring urged rotatable pressure rollers 12 respectively engage the feed rollers 11. Sheets fed edgewise downwardly from the feed drum 5 engage between the pairs of rollers 11 and 12 and are vertically and downwardly fed edgewise thereby past a photographic field 13 between the pairs of rollers 11 and 12, the sheet path being indicated by the dot and dash line 14 in Figure 3. The feed drum 5 and feed rollers 11 are driven in timed relation by gearing, generally designated at 15 in Figure 2, which are driven through a belt and pulley transmission 16 from an electric motor 17.

The axes of the feed drum 5 and rollers 11 and 12 are disposed horizontally and longitudinally of the cabinet, and a pair of opposed converging reflectors 18 are arranged in a horizontal plane and transversely of the vertical path of the fed sheets and obliquely to and on opposite sides of the photographic field 13 for reflecting images of opposite faces of the fed sheets as they pass the photographic field toward the end of the cabinet opposite that adjacent which the feed drum 5 and rollers 11 and 12 are disposed, incandescent electric lamps 19, provided with reflectors 20, being arranged on opposite sides of and adjacent the photographic field for illuminating the fed sheets as they pass the photographic field.

A photographic camera 21 is mounted at the end of the cabinet opposite that adjacent which the feed drum 5, rollers 11 and 12, and reflectors 18 are disposed, and its lens 22, see Figure 2, is directed toward the reflectors 18 to receive the images of opposite sides of the fed sheets which are reflected by these reflectors and to photograph them on a sensitized photographic film strip 23 in the camera.

The camera is of the flow type and is provided with a normally light tight film chamber 24 within which the film strip is exposed. See Figure 7. Vertically spaced rotatable reel spindles 25 and 26 are mounted within the camera and film reels 27 and 28, provided with axial mounting apertures 29, are detachably mounted on the reel spindles within the film chamber in a usual manner, the reel spindles and the mounting apertures 29 of the reels having the usual driving engagement so that rotation of the upper spindle 25 rotates the reel thereon for taking up the film strip as it is fed in the camera.

A rotatable exposure drum 31 is arranged within the film chamber inward of the photographic lens 22, and two rotatable adjacently spaced driving rollers 32 and 33 are arranged within the film chamber in adjacently spaced relation with the exposure drum. Two rotatable spaced guide rollers 34 and 35 are arranged within the film chamber and are respectively spaced above and below the rollers 32 and 33.

The reel which is mounted on the lower spindle 26, as shown the reel 28, functions as a feed reel, and the film strip 23 extends from a film roll on this reel about the lower guide roller 35, then in an opposite manner about the lower drive roller 33, then in an opposite manner about the exposure drum 31, then in an opposite manner about the upper drive roller 32, then in an opposite manner about the upper guide roller 34, and finally to a film roll on the reel which is mounted on the upper spindle 25, as shown the reel 27, on which the film strip is taken up. The exposure drum 31 and the drive rollers 32 and 33 are driven at the same peripheral speed by gearing generally designated at 36, and a yieldable belt and pulley transmission, generally designated at 37, serves to drive the upper spindle 25 and a reel mounted thereon from the drive roller 33 to take up the film strip as it is fed by the exposure drum and drive rollers.

The exposure drum 31 and the drive rollers 32 and 33 of the camera are driven from the driving motor 17 in timed relation with the sheet feeding rollers 11 and the feed drum 5 by a transmission, generally designated at 38, which is operative between the shaft of one of the feed rollers 11 and the camera and includes a clutch, generally designated 39, controlled by the fed sheets in a manner unnecessary to be described, so that the film strip is fed in the camera only during the actual photographing of the sheets while the feed drum 5 and feed rollers 11 are driven constantly while the driving motor is operating.

Images of opposite faces of sheets passing the photographic field 13 are simultaneously reflected by the reflectors 18 through the photographic lens 22 of the camera and onto the film strip 23 in the camera at the exposure drum 31 for the photographing of opposite faces of the sheets on the film.

An opaque light shield 41 within the cabinet is disposed across the projection path of the images of opposite faces of sheets passing the photographic field 13 between the camera 21 and the reflectors 18 and is provided with alined horizontally extending image area limiting light openings 42 and 43 therethrough through which the images of opposite faces of sheets passing the photographic field 13 are respectively projected, the width of these openings being adjustable for exposure control by means of vertically spaced horizontally disposed strips 44 which form the longitudinal or upper and lower margins of the openings and which are mounted on the shield 41 for vertical adjustment by adjustable securing means generally designated at 45.

Figures 7, 8, 9, 10:
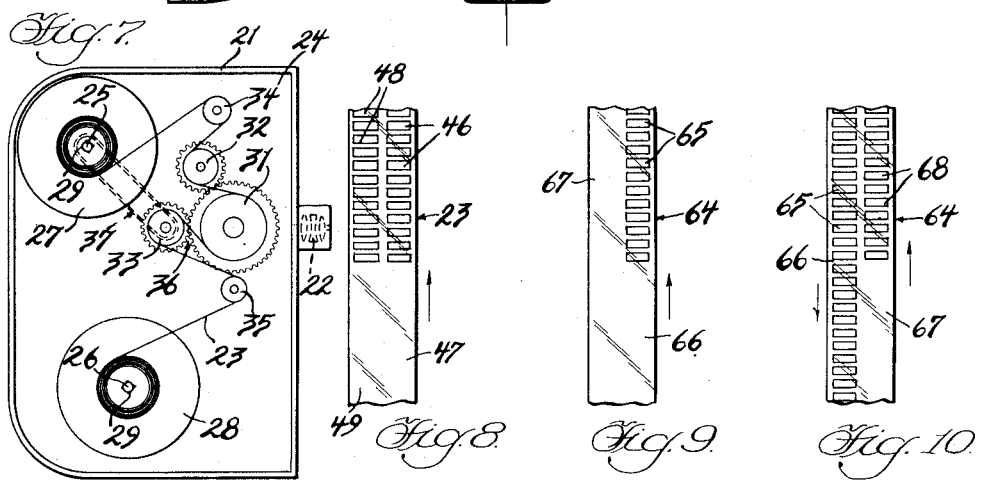
Figure 7 is an interior view of the photographic camera of the recorder.
Figures 8, 9 and 10 are face views of photographic strips used in the camera of the recorder and showing them in different conditions of exposure.

The film strip in the camera opposite the photographic lens 22, where the film is exposed, is fed in parallelism with the movement of the images of the sheets passing the photographic field 13, which are projected onto the film strip, and is fed in the direction opposite that of the movement of the images, so that the images of opposite faces of the sheets passing the photographic field 13 are respectively projected onto adjoining longitudinal sections of the film strip 23, and both faces of sequentially fed record bearing sheets are thus simultaneously progressively photographed respectively along adjoining longitudinal sections of the film strip. Figure 8 illustrates the simultaneous progressive exposure of both longitudinal sections of the film strip, the arrow indicating the direction of movement of the film strip, latent images 46 on one longitudinal section 47 of the film strip being those of one face of the sequentially fed sheets, and latent images 48 on the other longitudinal section 49 of the film strip being those of the other face of the sequentially fed sheets. When the film strip is fully exposed it is developed to form a micro-record.

A rod 51 extends horizontally above and along the light opening 43 in adjacent relation with the light shield 41, and is pivotally mounted adjacent its ends in brackets 52 and 53 secured on the shield. See particularly Figures 4, 5 and 6. A shutter 54 is secured on the rod 51 and extends radially therefrom and extending along the light opening 43, is pivotally movable with the rod 51 into and out of position closing the light opening 43, the open and closed positions of the shutter being shown respectively in full and in dot and dash lines in Figure 4.

A bell crank arm 55 is pivotally mounted at its angle, as designated at 56 in Figure 4, on an axis parallel to that of the rod 51, and one arm portion 57 of this arm extends upwardly for manual actuation and the other arm portion 58 of this arm extends across and beyond the axis of the rod 51 and is provided with a radial slot 59 at its outer end portion. An arm 61 is secured on the end of the rod 51 which is adjacent the arm 55, and is provided with a crank pin 62 which is slidably and pivotally engaged in the slot 59 of the arm portion 58, so that oscillation of the arm 55 effects movement of the shutter 54 into and out of position closing the light opening 43, the arm portion 58 and the crank pin 62 assuming over center relation with respect to the axis of the rod 51 in both the closed and open positions of the shutter 54. A tension spring 63 has its opposite ends respectively secured on the pivotal mounting 56 of the arm 55 and on the crank pin 62, and cooperates with the aforesaid over center relation of the arm portion 58 and the crank pin 62 to yieldably maintain the shutter 54 in either its open or closed position.

When the shutter 54 is in its open position and the light opening 43 is consequently open, both faces of the sequentially fed sheets are photographed respectively on the adjoining longitudinal sections of the film strip 23 as illustrated in Figure 8. However, when the shutter is in its closed position and the light opening 43 is consequently closed, images of only one face of the sequentially fed sheets are projected through the light opening 42 and are photographed on the corresponding longitudinal section of the film strip leaving the other longitudinal section of the film strip unexposed. Figure 9 illustrates the progressive exposure of one longitudinal section of a film strip 64, the arrow indicating the direction of movement of the film strip, latent images 65 on one longitudinal section 66 of the film strip being those of one face of the sequentially fed sheets, and the other longitudinal section 67 of the film strip being unexposed.

After having completed the exposure of the section 66 by the progressive photographing of images of one face of sequentially fed sheets thereon, images of one face of sequentially fed sheets are progressively photographed on the previously unexposed longitudinal section 67 of the film strip 64 with the shutter 54 still in closed position so as not to again expose the section 66. This is preferably accomplished in the following manner:

As a result of the exposure of the first longitudinal section 66 of the film strip 64 in the camera, substantially the entire length of the film strip is wound on the roll on the reel on the upper or take up spindle 25, this reel being the reel 27 in Figure 7, and after such exposure the film strip is reversed on the feeding means of the camera by facewise reversing the reels 27 and 28 and interchanging the reels on the reel spindles, so that the reel 27 carrying substantially the entire film strip is mounted in facewise reversed position on the lower spindle 26 to now serve as the feed reel and the reel 28 is mounted in facewise reversed position on the upper spindle 25 to now serve as the take up reel, and lacing the film strip about the exposure drum 31, drive rollers 32 and 33, and guide rollers 34 and 35 as previously described.

As so reversed, the second previously unexposed longitudinal section 67 of the film strip is positioned to have images of one face of sequentially fed sheets projected through the light opening 42 onto the same and photographed thereon whereby both longitudinal sections of the film are exposed. Figure 10 illustrates the progressive exposure of the second longitudinal section 67 of the film strip, the arrow at the left of the film strip indicating the direction of movement of the film strip during the photographing of the latent images 65 of one face of sequentially fed sheets on the first longitudinal section 66 of the film strip and, the arrow at the right of the film strip indicating the direction of movement of the film strip during the photographing of latent images 68 of sequentially fed sheets on the second longitudinal section 67 of the film strip. After the film strip is fully exposed it is developed in the usual manner to form the micro-record.

The entire shutter mechanism including the shutter 51 and the actuating arm 55 is disposed within the cabinet 1 so that it is not accessible while the top closure member 3 is in position closing the top opening 2. This prevents to a large extent accidental undesired positioning of the shutter and consequent undesired exposure of the film strip. However, when the top member 3 is in open position the actuating arm 55 is accessible through the top opening 2 for opening and closing the shutter, and the upper end of the arm portion 57 is provided with angularly related laterally extending portions 69 bearing different legends 71 and 72 for indicating the shutter position.

The open shutter position of the arm 55 is shown in full lines in Figures 4 and 5 in which the legend 71 is horizontal and thus indicates the simultaneous exposure of both longitudinal portions of the film strip, and the closed shutter position of the arm 55 is shown in dot and dash lines in Figure 4 in which the legend 72 is horizontal and thus indicates the exposure of only one of the longitudinal sections of a film strip.

Figure 11:
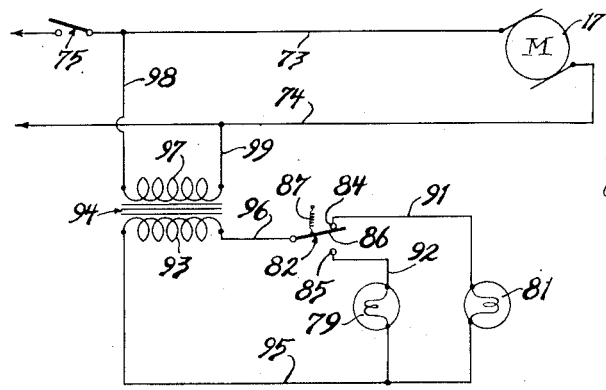
Figure 11 is a partial wiring diagram of the recorder showing the indicator and motor control circuiting of my invention.

The driving motor 17, see Figure 11, is connected in circuit with an electrical source by conductors 73 and 74 of which the conductor 73 includes a manually controlled switch 75 in series with the motor for energizing and deenergizing the motor. This switch, see Figures 1 and 3, is mounted on a control panel 76 carried by the support member 7 at the top of the cabinet, and mounted on this panel are two indicating devices 77 and 78 which, see Figure 11, are respectively inclusive of incandescent electric lamps 79 and 81.

A double throw switch 82, see Figure 4, is mounted on an extension 83 of the bracket 53. This switch is preferably of the snap action type, and, see Figure 11, this switch, comprising a pair of alternate contacts 84 and 85 and an intermediate movable contact 86 alternately engageable with the contacts 84 and 85, has the intermediate contact thereof normally urged into engagement with the contact 84 by a spring 87. The switch 82, see Figures 4 and 6, is provided with an actuating arm 88 which is operative on the intermediate contact 86 and when this arm is depressed it engages the intermediate contact 86 with the contact 85. The arm 88 lies in the path of a stud 89 secured on the shutter rod 51 and extending radially therefrom, and the arrangement is such that when the shutter 54 is in open position the stud 89 is disengaged from the arm 88 and the spring 87 engages the contacts 84 and 86, and when the shutter is in closed position the stud 89 is engaged with the arm 88 and engages the contacts 85 and 86.

The switch contact 84, see Figure 11, is connected with one terminal of the lamp 81 by a conductor 91, and the switch contact 85 is connected with one terminal of the lamp 79 by a conductor 92. The other terminals of these lamps are connected with one terminal of the secondary winding 93 of a step down transformer 94 by a branched conductor 95, and the other terminal of the secondary winding of the transformer is connected with the switch contact 86 by a conductor 96. Assuming the primary winding 97 of the transformer to be energized, the indicator circuit just described is energized so that when the shutter 54 is open the lamp 81 of the indicating device 78 is energized and when the shutter is closed the lamp 79 of the indicating device 77 is energized, thus clearly indicating the type of recording which is in effect with a view toward preventing improper recording.

One terminal of the primary winding 97 of the transformer 94 is connected with the conductor 73 between the switch 75 and the motor 17 by a conductor 98, and the other terminal of the primary winding 97 is connected with the conductor 74 by a conductor 99. Thus, the motor 17 and the indicator circuit are simultaneously energized and de-energized under the control of the switch 75 so that operation and nonoperation of the motor is indicated respectively by one of the indicator lamps 79 and 81 being energized and both of the lamps being de-energized, and the type of recording in effect is indicated during operation of the motor by one or the other of the indicator lamps 79 and 81 being energized, these three indications conveniently indicating to the operator the instant condition of the recorder.

While I have thus described my invention, I do not wish to be limited to the precise details described, as changes may be readily made without departing from the spirit of my invention, but having thus described my invention, I claim as new and desire to secure by Letters Patent the following:

1. In photographic micro-recording apparatus, the combination of sheet feeding means adapted to sequentially feed sheet material edgewise past a photographic field, a photographic camera, means for longitudinally feeding a sensitized photographic strip in said camera in timed relation with the feed of said sheet material, means for projecting from said photographic field images of opposite faces of said sheet material respectively onto adjoining longitudinal sections of said photographic strip, exposure control means for selectively cutting off the projection of images of one face of said sheet material to said photographic strip so as to expose only one of said strip sections to images of the other face of said sheet material, a cabinet enclosing the major portion of the apparatus and provided with an access opening at the top thereof and a top closure member movable into and out of position closing said opening, said exposure control means being disposed within said cabinet and being accessible for manual actuation through said opening, an electric motor associated with said cabinet for driving said sheet material and sensitized strip feeding means, two electro-responsive indicating devices associated with said cabinet and observable from the exterior thereof, an indicating circuit including said indicating devices and a double throw switch having its pair of alternate contacts respectively connected with said indicating devices for alternately energizing the same, switch actuating means operative between said exposure control means and said switch for alternately energizing said indicating devices to indicate the exposure or only one of said strip sections, and circuit means for simultaneously energizing said motor and said indicating circuit and deenergizing the same, to indicate operation and nonoperation of said motor.

2. In photographic micro-recording apparatus, the combination of sheet feeding means adapted to sequentially feed sheet material edgewise past a photographic field, a photographic camera, means for longitudinally feeding a sensitized photographic strip in said camera in timed relation with the feed of said sheet material, means for projecting from said photographic field images of opposite faces of said sheet material respectively onto adjoining longitudinal sections of said photographic strip, exposure control means for selectively cutting off the projection of images of one face of said sheet material to said photographic strip so as to expose only one of said strip sections to images of the other face of said sheet material, an electric motor for driving said sheet material and sensitized strip feeding means, two electro-responsive indicating devices, an indicating circuit including said indicating devices and a double throw switch having its pair of alternate contacts respectively connected with said indicating devices for alternately energizing the same, switch actuating means operative between said exposure control means and said switch for alternately energizing said indicating devices to indicate the exposure of both or only one of said strip sections, and circuit means for simultaneously energizing said motor and said indicating circuit and deenergizing the same to indicate operation and nonoperation of said motor.

3. In photographic micro-recording apparatus, the combination of sheet feeding means adapted to sequentially feed sheet material edgewise past a photographic field, a photographic camera, means for longitudinally feeding a sensitized photographic strip in said camera in timed relation with the feed of said sheet material, means for projecting from said photographic field images of opposite faces of said sheet material respectively onto adjoining longitudinal sections of said photographic strip, exposure control means for selectively cutting off the projection of images of one face of said sheet material to said photographic strip so as to expose only one of said strip sections to images of the other face of said sheet material, an electric motor for driving said sheet material and sensitized strip feeding means, two electro-responsive indicating devices, an indicating circuit including said indicating devices and a double throw switch having its pair of alternate contacts respectively connected with said indicating devices for alternately energizing the same, switch actuating means operative between said exposure control means and said switch for alternately energizing said indicating devices to indicate the exposure of both or only one of said strip sections, a step down transformer having its secondary winding included in said indicating circuit, and a second switch in circuit between an electrical source and said motor and between said source and the primary winding of said transformer for simultaneously energizing said motor and primary winding and deenergizing the same.

ELMER L. JOHNSON.

REFERENCES CITED

The following references are of record in the file of this patent:

UNITED STATES PATENTS

| Number | Name | Date |
|---|---|---|
| 1,391,807 | Swalm | Sept. 27, 1921 |
| 1,511,042 | Satterlee | Oct. 7, 1924 |
| 1,957,782 | Hyde | May 8, 1934 |
| 1,993,178 | Mitchell | Mar. 5, 1935 |
| 2,026,500 | Hutchings | Dec. 31, 1935 |
| 2,172,438 | De Heer | July 16, 1937 |
| 2,177,135 | Fassel | Oct. 24, 1939 |
| 2,219,458 | Sohns | Oct. 29, 1940 |
| 2,291,006 | Stuart | July 28, 1942 |
| 2,391,044 | Terry | Dec. 18, 1945 |
| 2,436,105 | Egan | Feb. 17, 1948 |
| 2,461,185 | Schubert | Feb. 8, 1949 |
| 2,509,072 | Pratt | May 23, 1950 |
| 2,552,266 | Egan | May 8, 1951 |